United States Patent [19]

Sato

[11] Patent Number: 5,200,862
[45] Date of Patent: Apr. 6, 1993

[54] ELIMINATING SIGNAL QUALITY DETERIORATIONS IN A REPRODUCED STILL IMAGE

[75] Inventor: Kouichi Sato, Fujimi, Japan

[73] Assignee: Asahi Kogaku Kogyo Kabushiki Kaisha, Tokyo, Japan

[21] Appl. No.: 759,616

[22] Filed: Sep. 16, 1991

Related U.S. Application Data

[63] Continuation of Ser. No. 637,922, Jan. 7, 1991, abandoned, which is a continuation of Ser. No. 238,314, Aug. 31, 1988, abandoned.

[30] Foreign Application Priority Data

Aug. 31, 1987 [JP] Japan .................. 62-217532

[51] Int. Cl.$^5$ .................................................. H04N 5/78
[52] U.S. Cl. .............................. 360/10.1; 360/35.1; 360/18; 360/27; 358/312
[58] Field of Search .......... 360/10.1, 11.1, 33.1, 360/35.1, 37.1, 34.1, 18, 27; 358/312, 313, 319, 335

[56] References Cited

U.S. PATENT DOCUMENTS

| | | | |
|---|---|---|---|
| 4,058,840 | 11/1977 | Hasparzak | 360/35.1 |
| 4,298,896 | 11/1981 | Heitmann | 360/11.1 |
| 4,647,987 | 3/1987 | Nutting | 360/35.1 |
| 4,849,832 | 7/1989 | Yamagoto | 360/33.1 |

FOREIGN PATENT DOCUMENTS 62-112483 5/1987 Japan .

OTHER PUBLICATIONS

English abstract of Japanese Unexamined Patent Publication No. 62-112483, May 23, 1987 Arakawa.

Primary Examiner—Andrew L. Smezek
Attorney, Agent, or Firm—Sandler Greenblum & Bernstein

[57] ABSTRACT

A device capable of reproducing recording information without error and which eliminates a deterioration in a reproduced image quality during a dubbing operation. The still image reproducing device has a change-over switch that is capable of selectively delivering a demodulated image signal obtained through delaying an image signal by a time corresponding to 0.5 H. A control circuit outputs a switching control signal upon completion of one full rotation of a recording medium. A decoder decodes the demodulated recording information in response to a decoder control circuit, enabling the decoder to operate when the change-over switch is delivering the demodulated composite image signal. In the still image recording device, the composite image signal is FM demodulated. The demodulated composite image signal is multiplexed with a signal obtained by encoding and modulating the recording information. The multiplexed signal is supplied to a recording head through the gate circuit. When the recording trigger signal is received, the gate circuit is opened if the decoder is not supplied with the enable signal at the moment when the rotation pulse is received. When the next rotation pulse is received, the gate circuit is closed if the enable signal is being received by the decoder.

19 Claims, 8 Drawing Sheets

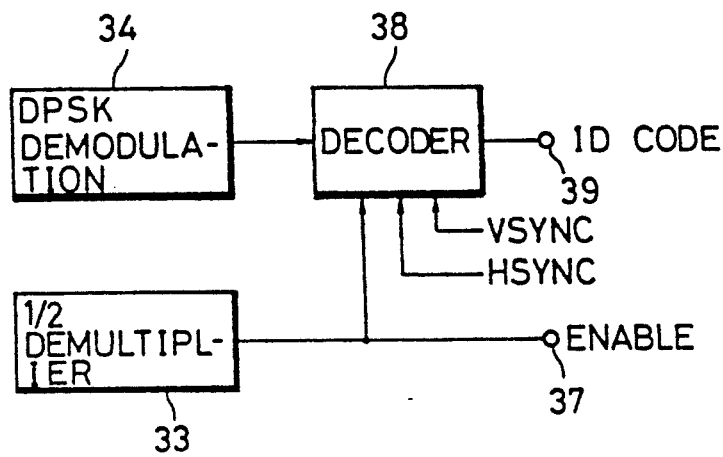
F I G. 5
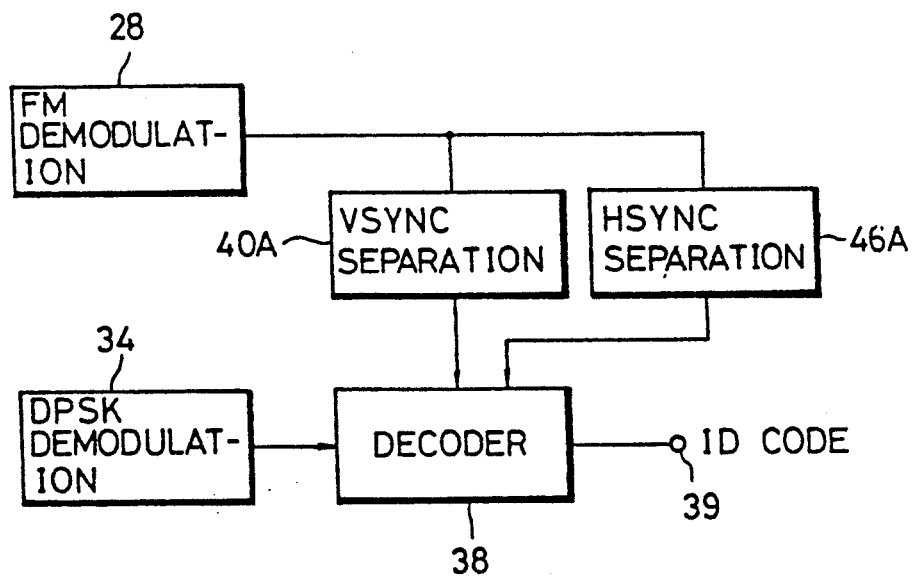
F I G. 6

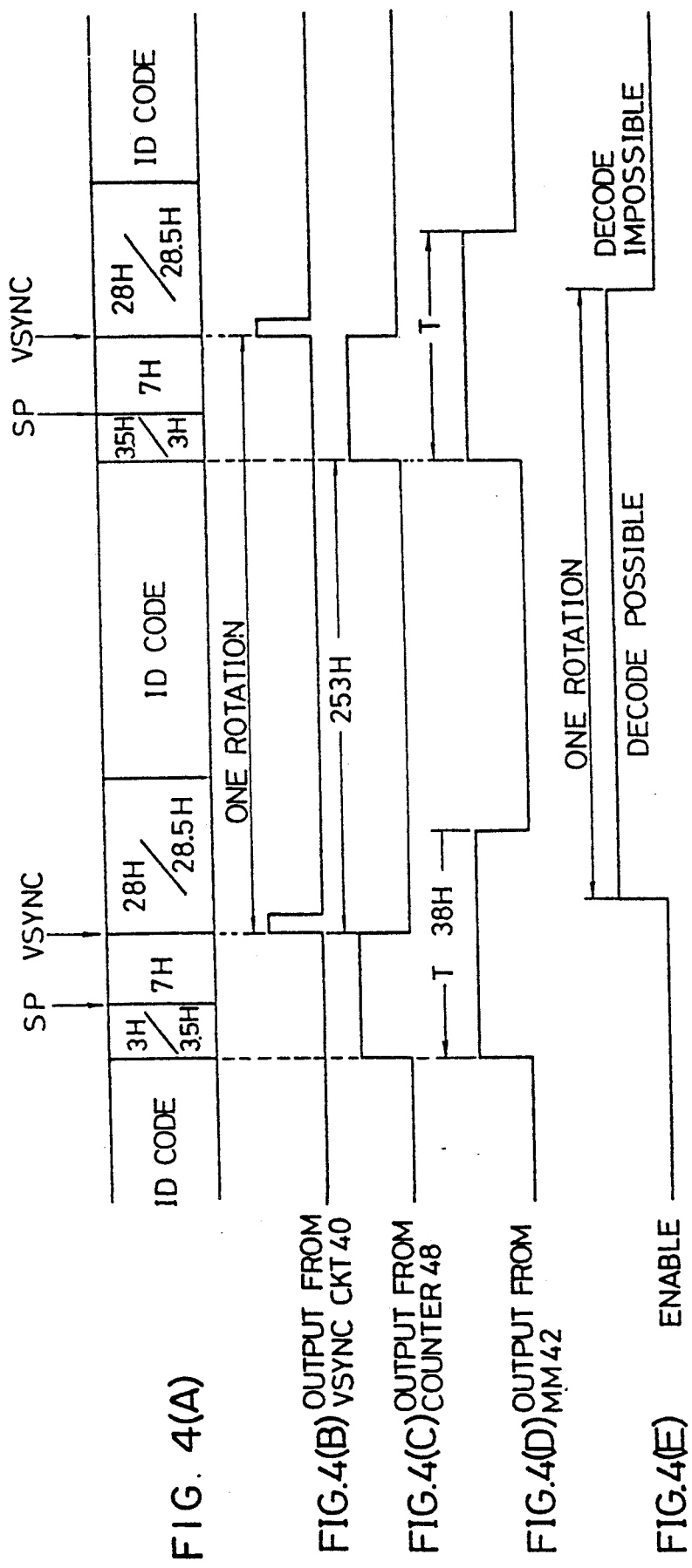

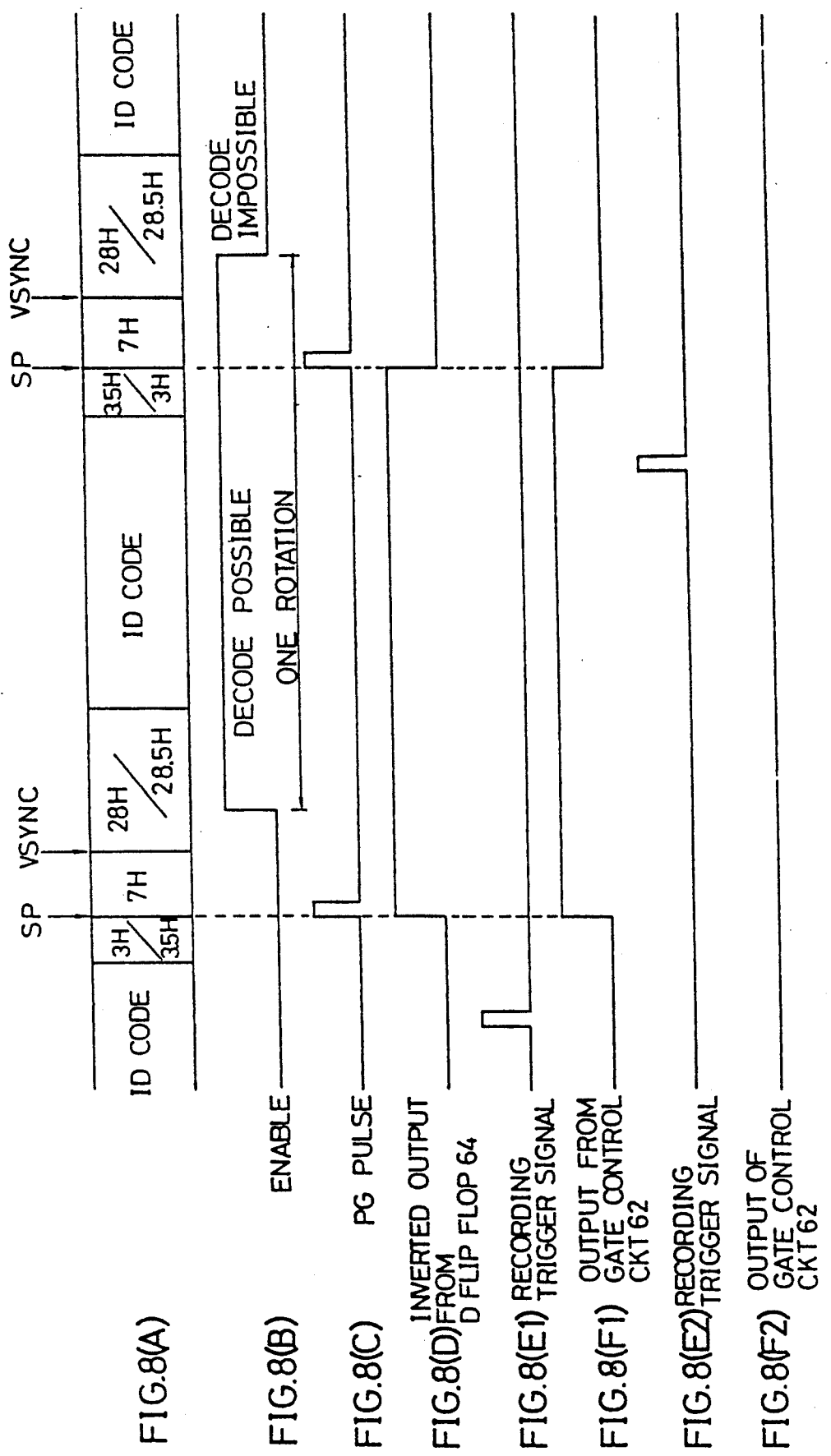

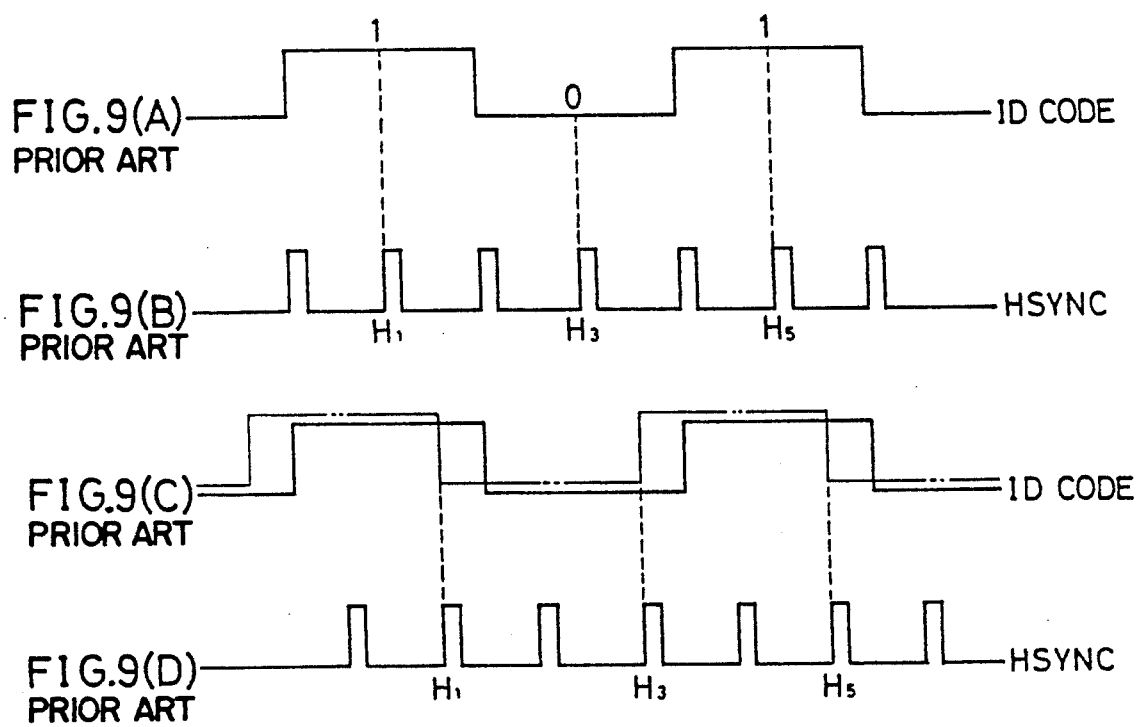

ELIMINATING SIGNAL QUALITY DETERIORATIONS IN A REPRODUCED STILL IMAGE

This application is a continuation of application Ser. No. 07/637,922, filed Jan. 7, 1991, now abandoned, which is a continuation of Ser. No. 07/238,314, filed on Aug. 31, 1988, now abandoned.

BACKGROUND OF THE INVENTION

1. Field of the Invention

The present invention relates to a device for reproducing and recording a still image. More particularly, the invention is concerned with a still image reproducing apparatus which is intended for use in reproducing a multiplexed signal that includes a composite image signal of a field picture and a recording information, such as date, month and year of the recording or photographing from a recording medium which records such a multiplexed signal, and also with a still image recording apparatus which is designed to be connected to the reproducing apparatus for the purpose of dubbing.

2. Description of the Prior Art

An electronic still camera, as an example of an electronic still image reproducing and recording devices, has been known which is capable of operating in a mode called "field image mode". In this mode, in order to maximize the number of still images recorded in a single magnetic disk, image signals corresponding to a single field is recorded on a single track. In the reproduction of the recorded image, this field image (original field image) is read out alternately with an interpolation field image which is obtained by delaying the original field image by a time which is half the horizontal scanning period H, which is 63.5 usec in the case of an NTSC type system.

The image signal comprising the still image includes various types of information, such as information as to whether the recorded image signal is a field image or a frame image, track No. representing the No. of the track in which each image is recorded, and recording data, such as, date, month and year of the recording. These various types of information which identifies the recorded image will be collectively referred to as ID code, hereinafter.

In the reproduction of the recorded image, the image signal and the ID code are read by a magnetic head and are separated from each other. The ID code is subjected to demodulation by DPSK (Differential Phase Shift Keying) and is decoded in accordance with a timing of a horizontal scanning pulse included in the image signal. The ID code includes a user's area having a plurality of bits, each of which corresponds to 2 or 4 pieces of horizontal synchronizing pulses (HSYNC). For instance, front edges of odd-number horizontal synchronizing pulses $H_1$, $H_2$, $H_3$ ... shown in FIG. 9(B) are used in determining whether the serial digital signal shown in FIG. 9(A) is of a "H" or "L" level. In the illustrated case, the data carried by this serial digital signal is judged as being "101 ...". When the data of a bit is "1", it is judged as being the value which is an inversion of the data of the immediately preceding bit, whereas, when the data is "0", it is judged that the information carried by this bit is the same as that in the immediately preceding bit.

In the case of the image signal of the interpolation field, when the level of the serial digital signal is judged at the timings of the front edges of the odd number horizontal synchronizing signals $H_1$, $H_2$, $H_3$, ..., only a small margin of 0.5 H, i.e., 31.75 usec, is available with respect to the jitter as will be seen from FIGS. 9(C) and 9(D). Consequently, error is caused in the reading of the recorded information when the rectangular wave is collapsed by the jitter, as shown by the two-dot-and-dash line.

In addition, a deterioration is inevitably caused in the image quality when a dubbed interpolation image signal is reproduced. The deterioration becomes serious as the dubbing is repeated.

SUMMARY OF THE INVENTION

Accordingly, an object of the present invention is to provide a still image reproducing device which is capable of reproducing recorded information without any error.

Another object of the present invention is to provide a still image reproducing device which is improved to eliminate any deterioration of reproduced image quality which may otherwise be caused by dubbing.

To these ends, according to the present invention, there is provided a still image recording device comprising: reading means for, from a rotating recording medium, a signal that is formed by multiplexing a composite image signal with a recording information; means for separating the composite image signal and the recording information from the signal read by the reading means; an FM demodulation circuit for effecting FM demodulation of the image signal separated by the separation circuit means; means for demodulating the recording information separated by the separation circuit means; means for delaying the demodulated image signal by a 0.5 H time thereby forming an interpolation field composite image signal; first change-over switch means having a control terminal and capable of selectively delivering the output signal from one of the FM demodulation circuit means and the delay circuit means in response to a first switching control signal supplied to the control terminal; first change-over switch control means capable of detecting a rotation of the recording medium and delivering, as the first switching control signal, a signal the level of which is inverted upon completion of one full rotation of the recording medium; decoder means designed to become operative in response to an enable signal and capable of decoding demodulated recording information; and decoder control means for supplying the decoder with the enable signal when the first change-over switch means is picking up the output signal from the FM demodulation circuit.

In operation, the recording information, i.e., the ID code, is decoded only when the first change-over switch means is delivering the original field composite image signal which is not delayed. It is therefore possible to correctly reproduce the ID code, regardless of the presence of jitter.

The device can have synchronizing signal separation means for separating and delivering vertical synchronizing pulses and horizontal synchronizing pulses from the image signal outputted from the FM demodulation circuit.

With this arrangement, it is possible to decode the demodulated recording information by utilizing the separated vertical synchronizing pulses and horizontal synchronizing pulses regardless of whether the first change-over switch means is delivering the output from the FM demodulation circuit.

The first change-over switch control means may have a pulse generator that is capable of outputting a rotation pulse each time it detects a detection object provided on the recording medium, and a demultiplier for conducting a ½ demultiplication of the rotation pulse and delivering the demultiplied signal as the first switching control signal.

The still image reproducing device of the present invention, having such an arrangement of the first change-over switch control means, can be connected to a still image recording device having the following features so as to form a dubbing system in which only the image signal of the original field, having no delay, is recorded in another recording medium, thus eliminating any deterioration of the recorded image quality which may otherwise be caused during the dubbing process.

The still image recording device suitable for combination with the still image reproducing device comprises: an FM demodulation circuit means for conducting an FM demodulation of the image signal output from the first change-over switch means; means for encoding the recording information outputted from the decoder by utilizing, as the timing signals, the separated vertical synchronizing signals and the separated synchronizing signals; recording information modulation circuit means for modulating the encoded recording information; synthesizing circuit means for multiplexing the modulated image signal with the modulated recording information; gate circuit means having a control terminal and which is operative in response to a control signal applied to the control terminal so as to selectively pass and interrupt the output from the synthesizing circuit means; recording means for recording the output from the gate circuit means in a recording medium; gate control circuit means for supplying the control terminal of the gate circuit means with the control signal, in such a manner that the control signal allows the gate circuit means to pass the output of the synthesizing signal when the enable signal is not being received by the decoder means at a moment when the rotation pulse is received after the issuance of a recording trigger signal, and that the control signal causes the gate circuit means to interrupt the output of the synthesizing circuit means when the enable signal is being received by the decoder means when the next rotation pulse is received.

BRIEF DESCRIPTION OF THE DRAWINGS

FIGS. 4(A) to 4(E) are timing charts illustrative of the operation of the first embodiment shown in FIG. 3;

FIG. 5 is a block diagram showing essential portions of a third embodiment of the still image reproducing device in accordance with the present invention;

FIG. 6 is a block diagram showing essential portions of a fourth embodiment of the still image reproducing device in accordance with the present invention;

FIGS. 8A to 8(F2) are timing charts showing the timing of a dubbing operation conducted with a system composed of the still image recording device of FIG. 7 and the still image reproducing device of the first or second embodiment; and FIGS. 9(A) to 9(D) are waveform charts illustrative of the operation of a known device.

DESCRIPTION OF THE PREFERRED EMBODIMENTS

Figure 1:
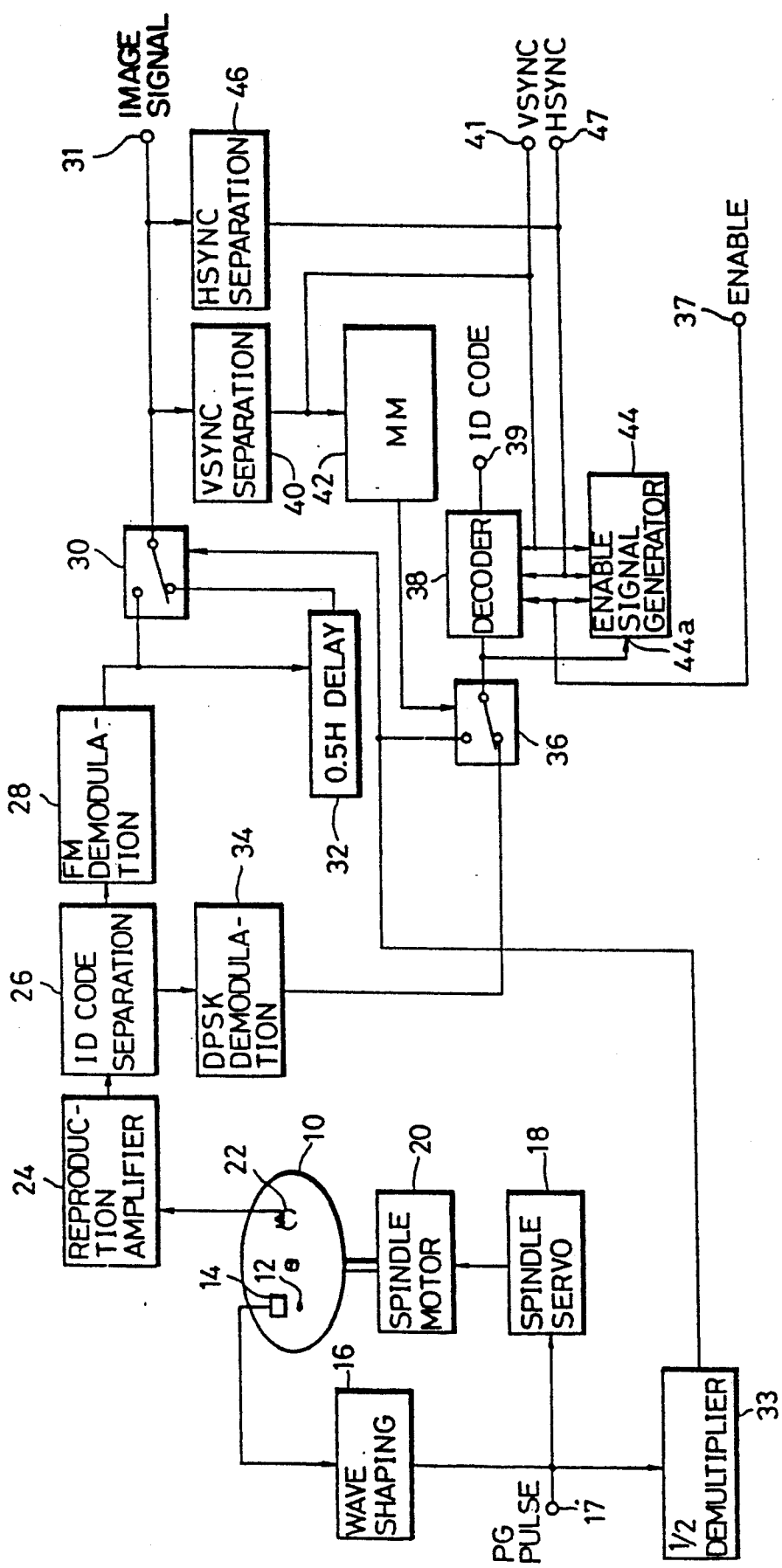
FIG. 1 is a block diagram showing essential portions of a first embodiment of the still image reproducing device in accordance with the present invention.

Referring to FIG. 1, which is a block diagram of a first embodiment of the still image reproducing device of the present invention, a magnetic disk 10, which functions as a recording medium, has a multiplicity of concentric tracks each of which are capable of recording one field image in the form of a signal which is formed by frequency-division multiplexing an FM-modulated composite color image signal and a DPSK-modulated ID code.

A small magnet 12 is attached to the magnetic disk 10, so as to serve as a reference for detecting the rotational position of the magnetic disk 10. The rotational position of the magnetic disk 10 is detected by a PG coil 14, which is sensitive to the magnetic flux from the magnet 12 on the disk 10. The pulses from the PG coil 14 are inputted to and shaped by a shaping circuit 16. A spindle servo circuit 18 controls the rotational speed and rotational phase of a spindle motor 20, in accordance with the PG pulses outputted from the shaping circuit 16.

Reference numeral 22 designates a magnetic head for reading information recorded on the magnetic disk 10. The output from the magnetic head 22 is inputted to a reproduction amplifier 24, the output of which is delivered to an ID code separation circuit which separates the image signal and the ID code from each other.

The image signal, i.e., a field image signal, derived from the ID code separation circuit is inputted to and FM-demodulated by an FM-demodulation circuit 28. An analog switch 30 is adapted for alternately delivering, to an output terminal 31, the image signal of the original field from the FM-demodulation circuit 28 and a image signal of an interpolation field which is formed by delaying the composite image signal of the original field through a 0.5 H delay line 32.

Reference numeral 33 designates a ½ demultiplier which is designed to conduct a ½ demultiplication of the PG pulse outputted from the shaping circuit 16 so as to turn ON and OFF the analog switch 30.

On the other hand, the ID code derived from the ID code separation circuit 26, in the form of a DPSK-modulated serial digital signal, is DPSK de-modulated by means of the DPSK demodulation circuit. The serial digital signal from the DPSK demodulation circuit 34 is analyzed, read, converted into parallel signals and then outputted by a decoder 38. An analog switch 36 is adapted for selectively delivering the signal from the DPSK demodulation circuit and the signal from the ½ demultiplication circuit 33 to the decoder 38.

Reference numeral 40 denotes a vertical synchronizing signal separation circuit which is adapted for separating vertical synchronizing signals (VSYNC) from the image signal. A monostable multivibrator 42 is adapted to be triggered by the front edge of each vertical synchronizing signal to deliver a pulse of a predetermined pulse width T so as to change-over the analog switch 36. In this embodiment, the period T is determined to meet the condition of T 28H.

A horizontal synchronizing signal separation circuit 46 is designed to separate horizontal synchronizing signals HSYNC from the image signal. An enable signal generating circuit 44 produces an enable signal ENABLE in accordance with the signals outputted from the ½ demultiplication circuit 33, vertical synchronizing signal separation circuit 40 and the horizontal synchronizing signal separation circuit 46. The PG signal, the enable signal ENABLE, the vertical synchronizing signal VSYNC and the horizontal synchronizing signal HSYNC are derived from terminals 17, 37, 41 and 47, respectively.

Figure 2:
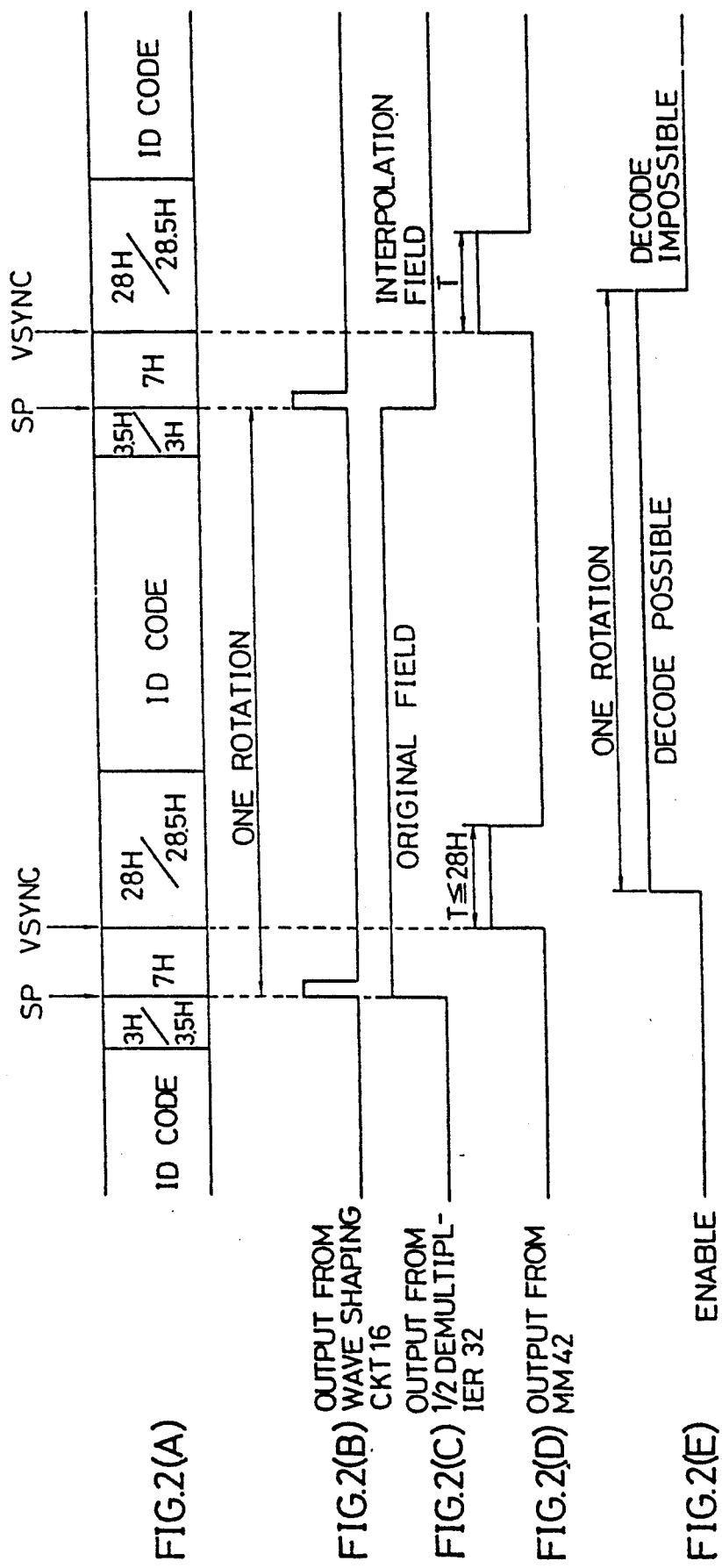
FIGS. 2(A) to 2(E) are timing charts illustrative of the operation of the first embodiment shown in FIG. 1.

The operation of the first embodiment will be described hereafter with reference to FIG. 2(A) showing the recording format, and FIGS. 2(B), to 2(E), which show timings of various signals.

FIG. 2(A) shows, in relation to the timing charts in FIGS. 2(B) to 2(E), the switch point SP detected by the PG coil 14 and the vertical synchronizing signal VSYNC and ID data detected by the magnetic head 22. Numerical values on slashes (/) represent the time lengths which are employed when odd-number fields are recorded, while numerical values under the slash represents the time lengths which are employed when even-number fields are recorded.

The spindle servo circuit 18 operates, upon receipt of a feedback signal which is the GP pulses from the shaping circuit 16, the rotational speed and the rotational phase of the spindle motor 20, i.e., the rotation speed and phase of the magnetic disk 10, in such a manner that the rotational speed of the magnetic disk 10 coincides with the field frequency (60 Hz) and that the vertical synchronizing signal VSYNC is detected at an instant which is 7 H from the instant of detection of the switch point SP.

The signal read from the magnetic head 22 is amplified by a reproduction amplifier 24. The amplified read signal is, inputted to the ID code separation circuit 26 so that the original field image signal and the ID code are separated from each other. The original field image signal is FM-demodulated by the FM-demodulation circuit 28 and is then delayed by a time 0.5 H through the 0.5 H delay line 32, so as to become an interpolation image signal. The output level of the ½ demultiplication circuit 33 is inverted each time the small magnet 12 is detected by the PG coil 14, i.e., in response to each full rotation of the magnetic disk 1. The analog switch 30 is switched to select the FM-demodulation circuit 28 when an output of a "H" level is derived from the ½ demultiplication circuit 33.

In consequence, the original field image signal and the interpolation image signal are alternately delivered to the output terminal 31 through the analog switch 30 each time the magnet 12 is detected by the PG coil 14 upon one full rotation of the magnetic disk 10.

Figure 7:
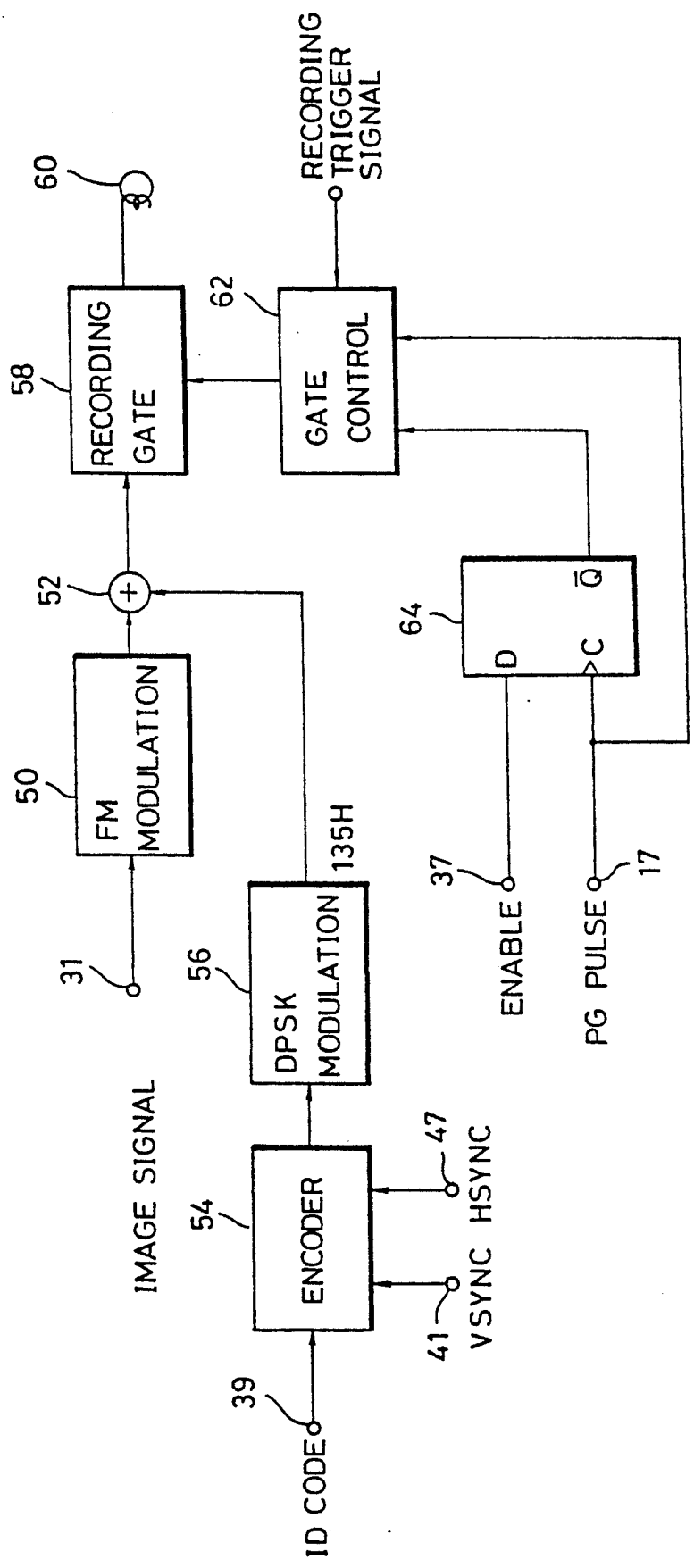
FIG. 7 is a block diagram showing essential portions of a still image recording device that is adapted to be connected to a still image reproducing apparatus of first or the second embodiment.

The vertical synchronizing signal VSYNC and the horizontal synchronizing signal HSYNC are separated from the image signal by the vertical synchronizing signal separation circuit 40 and the horizontal synchronizing signal separation circuit 46, respectively. As shown in FIG. 2(D), the mono-stable multivibrator 42 is triggered by the vertical synchronizing signal VSYNC, so as to produce a pulse of a predetermined time length T. In response to this pulse, the analog switch 36 is changed-over to select the ½ demultiplication circuit 33 for a period equal to the duration T of the pulse. If the level of the output from the ½ demultiplication circuit when selected by the analog switch 36 is "H", that is, if the original field signal from the FM-demodulation circuit 28 is being transmitted to the output terminal directly through the analog switch 30, the enable signal generating circuit 44 becomes operative. In other words, when the signal on the control terminal 44a is at the "H" level, the enable signal ENABLE is set "H" when a predetermined number of pulses HSYNC has been counted after the vertical synchronizing signal VSYNC is received by the ENABLE generating circuit 44, as shown in FIG. 2(E), and the enable signal ENABLE of a "H" level thus obtained is supplied to the decoder 38. The "H" level of the enable signal ENABLE is maintained for the period of the vertical scanning (field time) regardless of the level of the signal on the control terminal 44a of the ENABLE signal generating circuit 44. When the output of the monostable multi-vibrator circuit 42 is changed to a "L" level, the analog switch 36 is changed-over so that the ID code, in the form of a serial digital signal, is supplied from the DPSK demodulation circuit 34 to the decoder 38. In consequence, the ID code is analyzed and read at the timings of the front edges of the odd-number horizontal synchronizing signals $H_1$, $H_2$, ... as counted from the receipt of each vertical synchronizing signal VSYNC, and is converted into a parallel signal and outputted through the output terminal 39, as shown in FIG. 7.

When the level of the output from the ½ demultiplication circuit 33 is "L", i.e., when the interpolation field image signal is being supplied to the output terminal 31 through the 0.5 H delay line 32 and the analog switch 30, the output of the mono-stable multivibrator 42 is set "H" so that the analog switch 36 is switched to the ½ demultiplication circuit 33 and is maintained in this state for a predetermined time. Meanwhile, the control terminal 44a of the ENABLE signal generating circuit 44a is set at a "L" level so that the enable signal ENABLE is not supplied from the ENABLE signal generating circuit 44. Therefore, after elapse of a predetermined time T, the output of the mono-stable multivibrator 42 is set at a "L" level, so that the decoder 38 is kept inoperative, even when the serial digital signal is supplied to the decoder 38.

Therefore, a margin corresponding to 1H is always maintained with respect to the jitter, as shown in FIGS. 9(A) and 9(B), so that any error in reading the ID code is eliminated even when the rectangular wave is deviated from the jitter.

Figure 3:
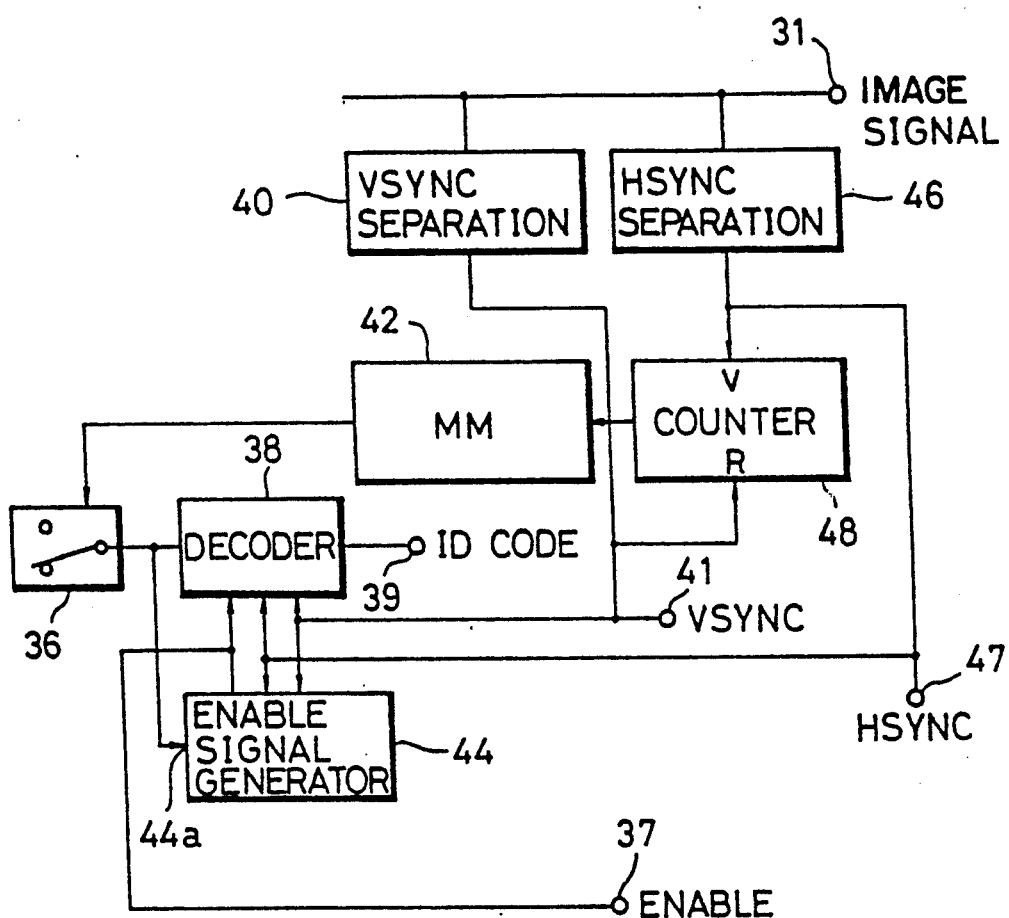
FIG. 3 is a block diagram showing essential portions of a second embodiment of the still image reproducing device in accordance with the present invention.

A second embodiment of the present invention will be described hereinunder with reference to FIG. 3 and Figs. 4(A) to 4(E). FIG. 3 illustrates only the portions of the second embodiment which are different from those in the first embodiment shown in FIG. 1. FIGS. 4(A) and 4(B) are identical to FIGS. 2(A) and 2(B), respectively, while FIGS. 4(D) and 4(E) correspond to FIGS. 2(D) and 2(E) respectively.

In this embodiment, the mono-stable multivibrator 42 is triggered in a manner which is different from that in the first embodiment, as will be understood from the following description. Namely, in this second embodiment, the counter 48 is reset by the vertical synchronizing signal VSYNC from the vertical synchronizing signal separation circuit 40 (see FIGS. 4(A) to 4(C)) and the horizontal synchronizing pulses from the horizontal synchronizing signal separation circuit 46 are counted by a counter 48. The counter 48 maintains its output at a "H" level from a moment at which it counts 253 and a moment at which it counts 263, and this output of "H" level is supplied to the mono-stable multivibrator 42 so as to trigger the same (see Figs. 4(C) and 4(D)). The timing of the front edge of the output from the counter 48 coincides with the terminal end point of the ID code so that the width T of the output pulse from the mono-stable multivibrator 42 is greater than that in the first embodiment. In this embodiment, the pulse width T should be determined to meet the condition of T 38H. Other portions are materially the same as those in the first embodiment.

A description will be made of a third embodiment of the still image reproducing device in accordance with the present invention, with specific reference to Figs. 5. The third embodiment is characterized in that the output signal from the DPSK demodulation circuit 34 is directly supplied to the decoder 38, which also directly receives, as the enable signal, the output signal from the ½ demultiplication circuit 33.

Thus, the third embodiment is devoid of the analog switch 36, mono-stable multivibrator 42 and the enable signal generating circuit 44 which are shown in FIG. 1. Other portions of the third embodiment are materially the same as those of the first embodiment.

A fourth embodiment of the still image reproducing device of the present invention will be described with reference to FIG. 6. In this fourth embodiment, the output signal from the DPSK demodulation circuit 34 is directly supplied to the decoder 38. At the same time, an additional vertical synchronizing signal separation circuit 40A and horizontal synchronizing signal separation circuit 46A are provided besides the vertical synchronizing signal separation circuit 40 and the horizontal synchronizing signal separation circuit 46 used in the embodiment shown in FIG. 1, and the signals from these additional circuits 40A and 46A are delivered to the decoder 38 so as to keep the decoder 38 always in an enabled state.

In this embodiment, the synchronizing signal separation circuits 40 and 46 corresponding to those in the embodiment shown in FIG. 1 are used only for the purpose of supplying signals to external terminals 41 and 47.

The fourth embodiment as described also is devoid of the analog switch 36, monostable multivibrator 42 and the enable signal generation circuit 44, as is the case of the third embodiment. Other portions are materially the same as those in the first embodiment.

A description will be made of an example of an application of the still image reproducing device of the present invention, in which the output terminals of the device according to the first embodiment or the second embodiment are connected to a still image recording device, with specific reference to FIGS. 7 and 8(A) to 8(F2). FIGS. 8(A), 8(B) and 8(C) are identical to FIGS. 2(A), 2(B) and 2(C), respectively.

The color image signal is supplied through terminal 31 to the FM demodulation circuit 50 so as to be demodulated by the circuit 50. Thus, the demodulated signal is delivered to one of the input terminals of a synthesizing circuit 52. On the other hand, the ID code is supplied to the encoder 54 through terminal 39. The encoder 54 operates by using, as the timing signals, the vertical synchronizing signals VSYNC and the horizontal synchronizing signals HSYNC which are supplied thereto through terminals 41 and 47, so as to encode the ID code and to convert the same into parallel signals. The parallel signals are then subjected to DPSK modulation conducted by the modulation circuit 56 and the output from this circuit is delivered to the other input terminal of the synthesizing circuit 52. The synthesizing circuit 52 delivers a signal which is formed by frequency-division multiplexing of the modulated composite color image signal with the ID code. This output signal is delivered to the magnetic head 60 through the recording gate 58 so as to be dubbed to a magnetic disk 10, which is not shown.

The recording gate 58 is opened only when the control signal from the gate control circuit 62 is set at a "H" level. The gate control circuit 62 operates in the following manner upon receipt of a recording trigger signal (see FIG. 8(EI)) which is produced when a recording switch (not shown) is manipulated. Namely, this gate control circuit 62 delivers an output of a "H" level as shown in FIG. 8(Fl) on condition that the inversion output signal Q from the D flip-flop 64 has been set at a "H" level and maintained at this level (see FIGS. 8(C) and 8(D)) when the PG pulse delivered through the terminal 17 is set at a "H" level after the receipt of the above-mentioned recording trigger signal. The data input terminal D of this D flip-flop 64 is supplied with the enable signal ENABLE shown in FIG. 8(B) through the terminal 37, while the clock terminal C of the same receives the PG pulse shown in FIG. 8(C) through the terminal 17.

Referring now to FIG. 8(E2), when the recording trigger signal is received during reproduction of the interpolation field, the output from the gate control circuit 62 is maintained at a "L" level as shown in FIG. 8(F2), so that the recording gate circuit 58 is not opened. In this case, the recording trigger signal is generated and output only once more after one rotation of the magnetic disk.

In consequence, the recording gate 58 is opened to allow the dubbing only during one rotation of the magnetic disk 10, during which the image signal of the original field is reproduced, whereas the dubbing process is inhibited during reproduction of the interpolation field. Thus, the dubbing of the image signal of the interpolation field into the magnetic disk is prevented so that any deterioration of the image quality which may otherwise be caused as a result of dubbing the interpolation field is eliminated.

In addition, it is possible to conduct dubbing of the ID code regardless of the presence of any jitter.

Although the invention has been described through specific terms, it is to be understood that the described embodiments are only illustrative. For instance, the invention can be applied to cases where an electric recording medium or an optical recording medium is used as the recording medium, although a magnetic disk-type recording medium has been specifically mentioned in the description of the embodiments.

Other changes and modifications are possible without departing from the scope of the invention which is limited solely by the appended claims.

What is claimed is:

1. A still image reproducing device, comprising:
   first means for reproducing recording information that is taken from a recording medium, in which a field image signal and said recording information regarding a still image are recorded in a multiplexed recording form;
   second means for reproducing said field image signal that is taken from said recording medium;

means for producing an interpolation image signal by delaying said field image signal that is reproduced by said second reproducing means;

means for alternately switching between an output of said second reproducing means and an output of said interpolation image signal producing means; and means for decoding said recording information that is reproduced by said first reproducing means so as to decode said recording information with a synchronous signal that is contained in said field image signal that is outputted by said second reproducing means, only when said second reproducing means is switched to output said field image signal.

2. The still image reproducing device of claim 1, wherein said recording medium comprises a magnetic disk.

3. The still image reproducing device of claim 1, wherein said decoding means comprises:

a decoder; and a synchronizing signal separation circuit that separates said field image signal into vertical synchronizing pulses and horizontal synchronizing pulses, said decoding means conducting a decoding operation by utilizing said vertical synchronizing pulses and said horizontal synchronizing pulses.

4. The still image reproducing device of claim 3, wherein said decoding means further comprises a monostable multivibrator that is triggered by said vertical synchronizing pulses.

5. The still image reproducing device of claim 4, further comprising a counter that is reset by said vertical synchronizing pulses, said monostable multivibrator counting said horizontal synchronizing pulses.

6. The still image reproducing device of claim 5, wherein said counter outputs a HIGH signal for a predetermined count, said HIGH signal being employed to trigger said monostable multivibrator.

7. The still image reproducing device of claim 1, wherein an output of said first reproducing means and an enable signal are directly inputted to said decoding means.

8. The still image reproducing device of claim 1, further comprising a synchronizing signal separation circuit that separates said field image signal into vertical synchronizing pulses and horizontal synchronizing pulses that are directly inputted, along with an output of said first reproducing means, to said decoding means.

9. The still image reproducing device of claim 8, wherein said synchronizing signal separation circuit supplies said vertical synchronizing pulses and horizontal synchronizing pulses to an external apparatus.

10. A still image reproducing device, comprising:

a first demodulator that reproduces information that is obtained from a recording medium, in which a field image signal and said information regarding a still image are recorded in a multiplexed recording form;

a second demodulator that reproduces said field image signal that is taken from said recording medium;

an interpolator that produces an interpolation image signal by delaying said field image signal reproduced by said second demodulator;

a switch that alternately switches between an output of sid second demodulator and an output of said interpolator;

a decoder; and a synchronizing signal separation circuit that separates said field image signal into vertical synchronizing pulses and horizontal synchronizing pulses, said decoder utilizing said vertical synchronizing pulses and said horizontal synchronizing pulses to decode said information that is reproduced by said first demodulator so as to decode said recording information with a synchronous signal that is contained in said field image signal that is outputted by said second demodulator, only when said second demodulator is switched to output said field image signal.

11. The signal image reproducing device of claim 10, further comprising a monostable multivibrator that is triggered by said vertical synchronizing pulses.

12. The still image reproducing apparatus of claim 11, further comprising a counter that is reset by said vertical synchronizing pulses, said monostable multivibrator counting said horizontal synchronizing pulses, said counter outputting a HIGH signal for a predetermined count that is employed to trigger said monostable multivibrator.

13. The still image reproducing device of claim 10, wherein an output of said first demodulator and an enable signal are directly inputted to said decoder.

14. The still image reproducing device of claim 10, wherein said synchronizing signal separation circuit comprises a vertical synchronizing separation circuit and a horizontal synchronizing separation circuit that separates said field image signal into respective vertical synchronizing pulses and horizontal synchronizing pulses that are directly inputted, along with an output of said first demodulator, to said decoder.

15. A still image reproducing device, comprising:

means for retrieving information that is stored in a storage device;

a code separator that obtains a field image signal from said retrieved information;

a first demodulator that produces a serial digital signal from said field image signal obtained by said code separator;

a second demodulator that reproduces said field image signal that is obtained by said code separator;

an interpolator that produces an interpolation image signal by delaying said field image signal reproduced by said second demodulator;

a switch that alternately switches between an output of said second demodulator and an output of said interpolator;

a synchronizing signal separation circuit that separates said field image signal into vertical synchronizing pulses and horizontal synchronizing pulses; and a decoder that utilizes said vertical synchronizing pulses and said horizontal synchronizing pulses to decode said retrieved information by said first demodulator so as to decode said retreived information with a synchronous signal that is contained in said field image signal that is outputted by said second domodulator, only when said second demodulator is switched to output said field image signal.

16. The still image reproducing device of claim 15, further comprising a monostable multivibrator that is triggered by said vertical synchronizing pulses.

17. The still image reproducing device of claim 16, further comprising a counter that is reset by said vertical synchronizing pulses, said counter outputting a HIGH signal for a predetermined count so as to trigger said monostable multivibrator that counts said horizontal synchronizing pulses.

18. The still image reproducing device of claim 15, wherein an output of said first reproducing means and an enable signal that is produced by an enable signal generator are directly inputted to said decoder.

19. The still image reproducing device of claim 15, wherein said synchronizing signal separation circuit comprises a vertical synchronizing separation circuit and a horizontal synchronizing separation circuit that separates said field image signal into respective vertical synchronizing pulses and horizontal synchronizing pulses that are directly inputted, along with an output of said first reproducing means, to said decoder.

* * * * *

UNITED STATES PATENT AND TRADEMARK OFFICE
CERTIFICATE OF CORRECTION

PATENT NO. : 5,200,862
DATED : April 6, 1993
INVENTOR(S) : Kouichi SATO

It is certified that error appears in the above-indentified patent and that said Letters Patent is hereby corrected as shown below:

At column 9, line 66 (claim 10, line 14) of the printed patent, please change "sid" to ---said---.

Signed and Sealed this

Twenty-ninth Day of August, 1995

Attest:

BRUCE LEHMAN

*Attesting Officer*  *Commissioner of Patents and Trademarks*